May 26, 1964 J. F. BRADY 3,134,863
ALTERNATING CURRENT 180 ELECTRICAL DEGREE SYNCHRONOUS SWITCH
Filed March 6, 1962 5 Sheets-Sheet 1

INVENTOR.
JOHN F. BRADY
BY John A. Harvey
ATTORNEY

INVENTOR.
JOHN F. BRADY

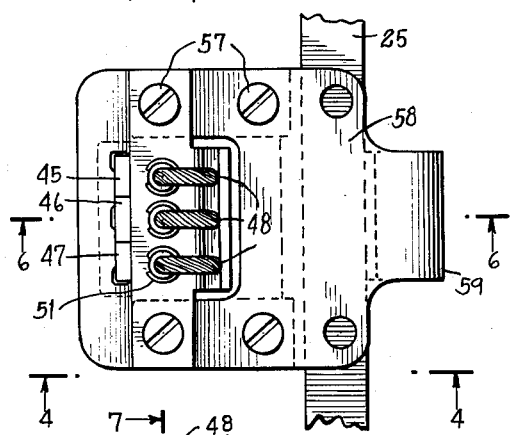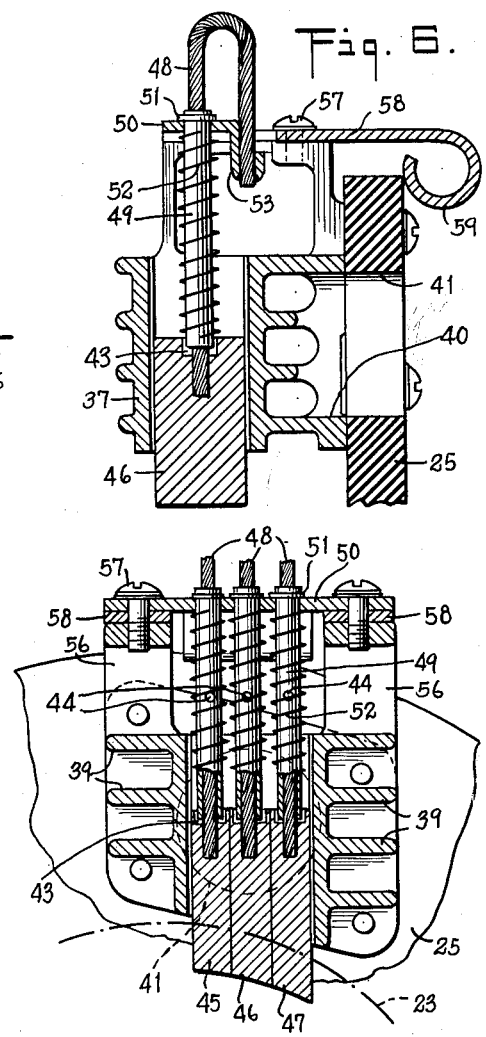

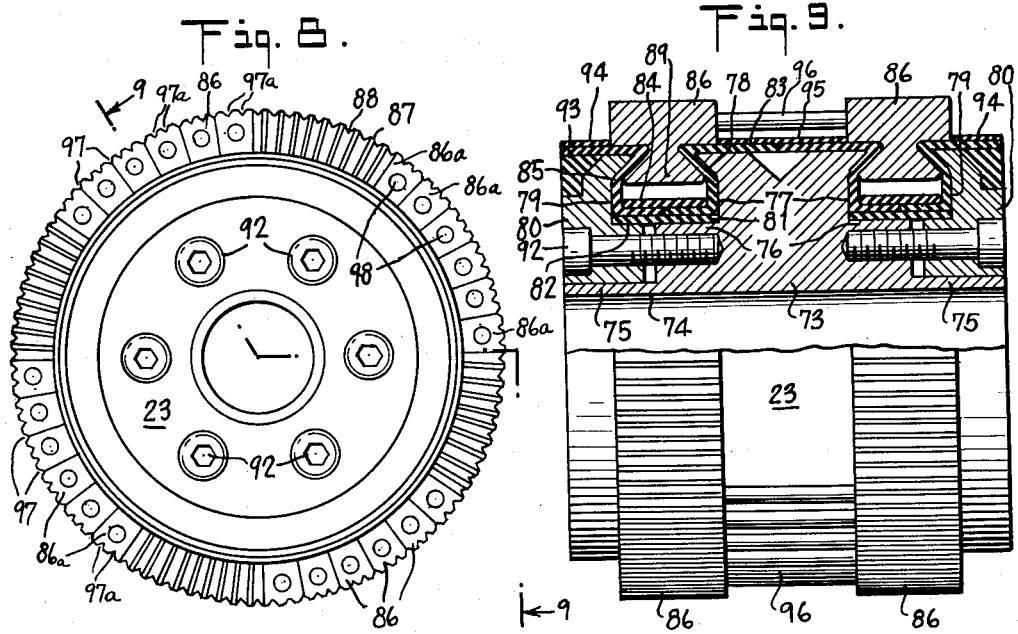
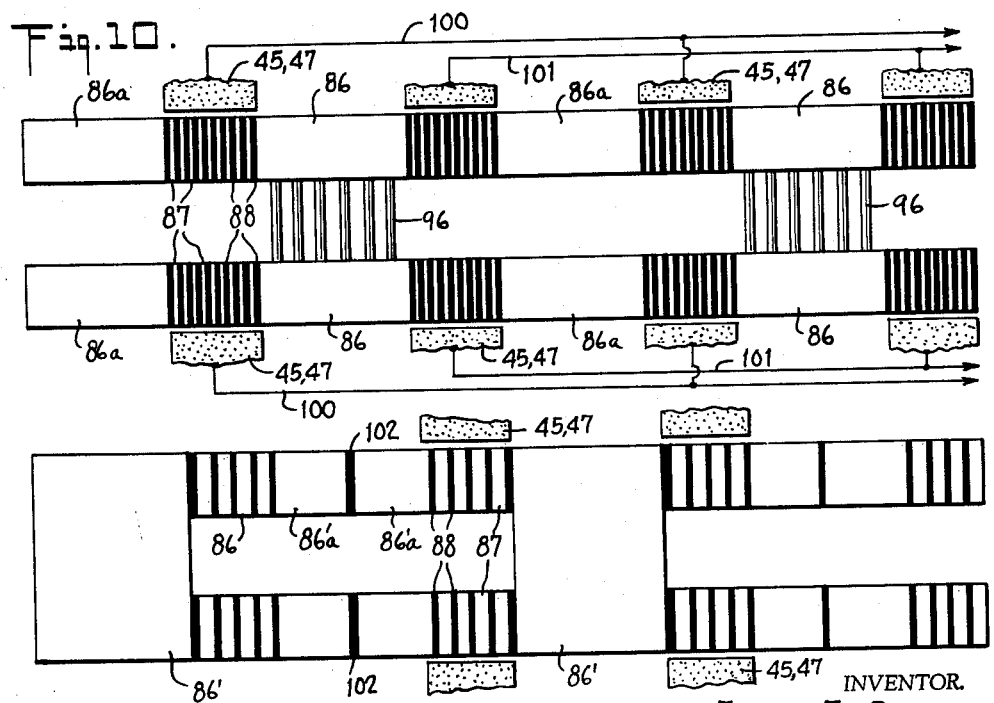

May 26, 1964  J. F. BRADY  3,134,863
ALTERNATING CURRENT 180 ELECTRICAL DEGREE SYNCHRONOUS SWITCH
Filed March 6, 1962  5 Sheets-Sheet 5
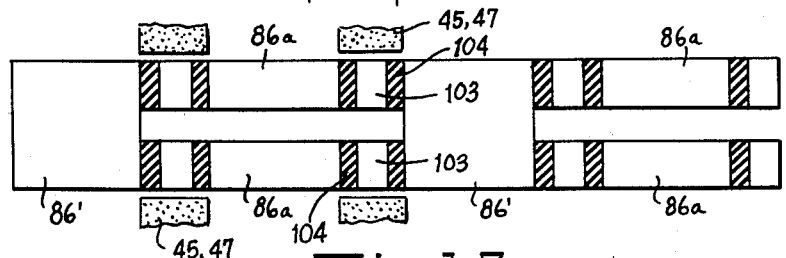
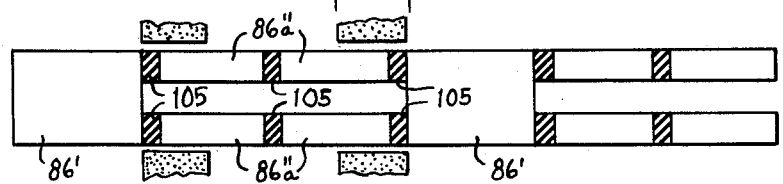
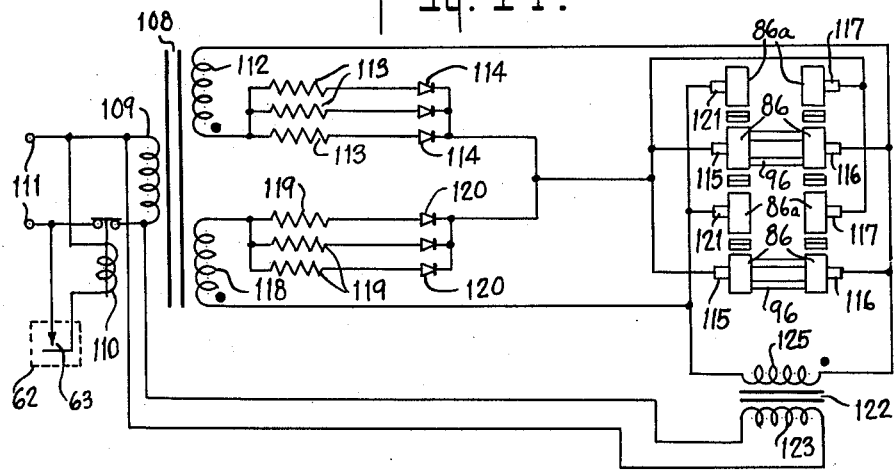
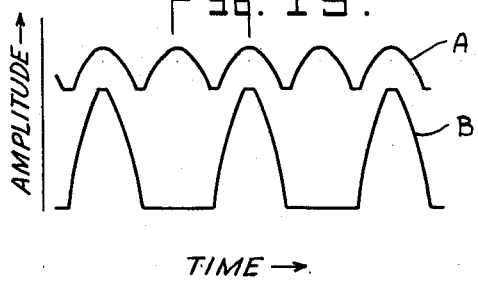
INVENTOR.
JOHN F. BRADY
BY John A. Harvey
ATTORNEY

United States Patent Office 3,134,863
Patented May 26, 1964

3,134,863
ALTERNATING CURRENT 180 ELECTRICAL DEGREE SYNCHRONOUS SWITCH
John F. Brady, Clifton, N.J., assignor to The Daven Company, Livingston, N.J., a corporation of Delaware
Filed Mar. 6, 1962, Ser. No. 177,813
14 Claims. (Cl. 200—24)

The present invention relates to alternating current synchronous switches and, particularly, to rotary switches of the full-wave rectification type which are required to conduct large values of current of the order of hundreds of amperes.

Alternating current synchronous switches of the rotary type are often called mechanical rectifiers. They are characterized by relatively high reliability in operation, but as heretofore constructed their use has been rather severely restricted to a few low voltage and low current applications. These switches or mechanical rectifiers have heretofore used either of two forms of construction. One completes electrically switched circuits through fixed brushes engaging a multi-segment rotatable commutator energized through individual slip rings and associated stationary brushes individual to each such slip ring. The other form of construction has a rotable brush energized through a slip ring and its associated brush, and the rotatable brush engages an axially concentric series of fixed conductive segments connected to electrical circuits for switching purposes. Unusally severe and difficult problems arise in these prior forms of synchronous switch or mechanical rectifier where the structure is required to commutate or switch large values of current of the order of 100 or more amperes. This is particularly true in connection with alternating current applications where current conduction must extend over substantially 180 electrical degrees of each half cycle of the alternating current. Relatively long 180° conduction intervals have heretofore dictated a minimum brush dimension in the direction of the commutator (or brush) rotation, and large values of current conduction then require that the brush have rather substantial axial dimension transverse to the direction of rotation if brush overheating and excessive brush arcing is to be avoided.

It would be desirable to provide a simpler, more compact, and less expensive synchronous switch construction wherein the rotatable commutator segments merely function to complete an electrical circuit between pairs of axially spaced stationary brushes. This form of construction becomes highly impractical where, in conformity with prior practices, the brushes must have substantial axial dimension for reasons of adequate current capacity and to avoid excessive voltage drop through the brushes yet must be relatively thin to insure full 180 electrical degree conduction of alternating currents without excessive brush arcing.

It is an object of the present invention to provide a new and improved alternating current synchronous switch of the motor driven type and one which while providing large current switching capacity avoids one or more of the disadvantages of limitations of prior synout excessive brush arcing.

It is a further object of the invention to provide a motor driven alternating current synchronous switch of compact and simplified construction, one having an unusually large current handling capacity of the order of hundreds of amperes while at the same time enabling current conduction through a full 180 electrical degrees of each half cycle of the alternating current with freedom from brush overheating or excessive brush voltage drop or brush arcing, and one capable of handling large values of voltage.

Other objects and advantages of the invention will appear as the detailed description thereof proceeds in the light of the drawings forming a part of this application and in which:

FIGS. 3–7 illustrate the construction of a brush holder metallic housing, and its assembly with spring-biased brushes, used in the switch construction;

FIGS. 8 and 9 illustrate the construction of a commutator drum member used in the switch to provide an electrical commutator of the type shown in the developmental view of FIG. 10;

FIGS. 11–13 are developmental views of commutator constructions embodying the present invention in modified forms;

FIG. 14 is an electrical circuit arrangement illustrating an application of the synchronous switch of the present invention as used in a rectifier device test system; and FIG. 15 graphically represents certain current and voltage waveforms which prevail in the FIG. 14 test system and illustrate desired operational characteristics of the synchronous switch herein disclosed and described.

Figure 1:
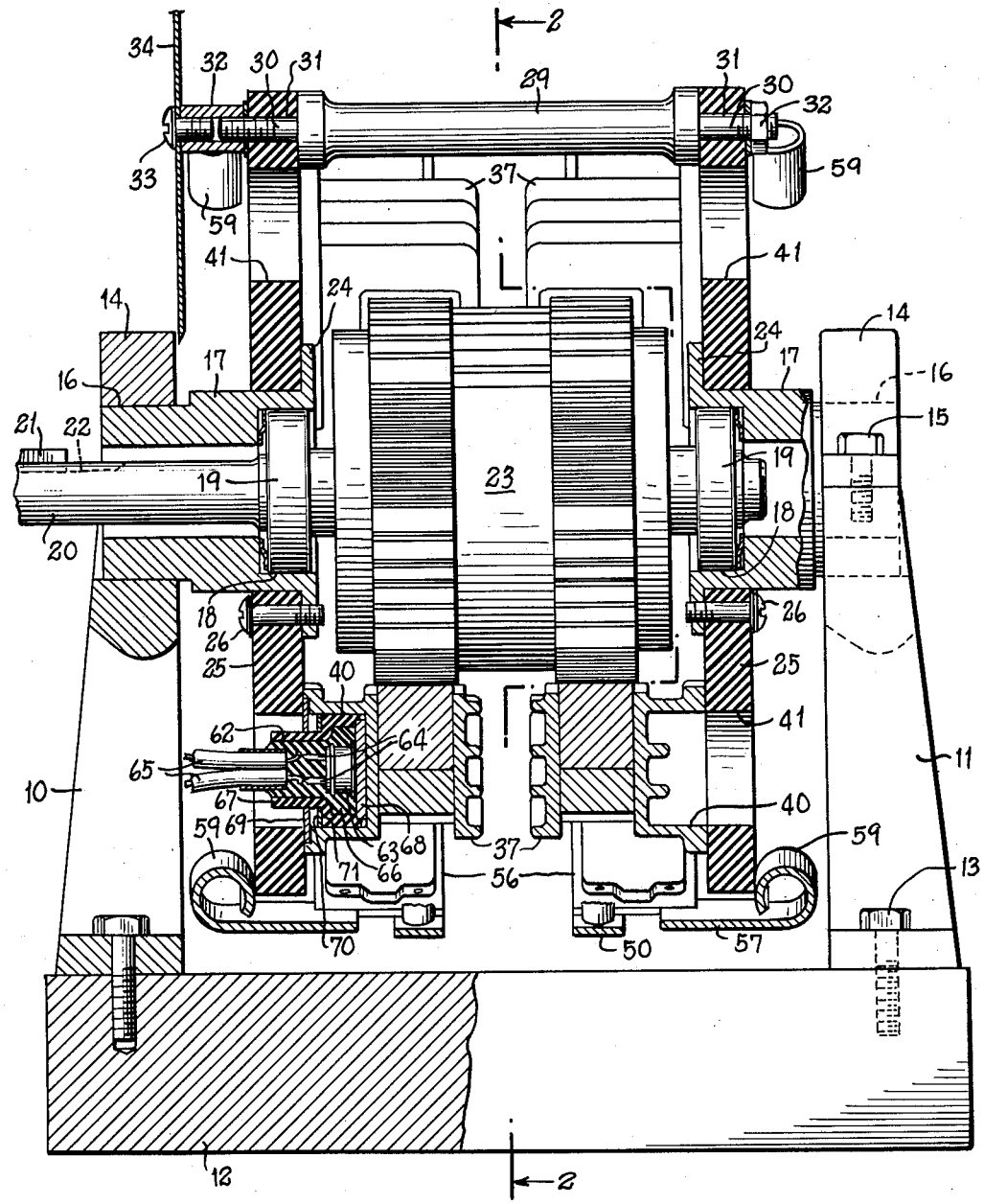
FIG. 1 is an elevational view, particularly in cross-section, of an alternating current synchronous switch embodying the present invention in a particular form, FIG. 2 being an end elevational view of the switch taken along the plane 2—2 of FIG. 1.
Figure 2:
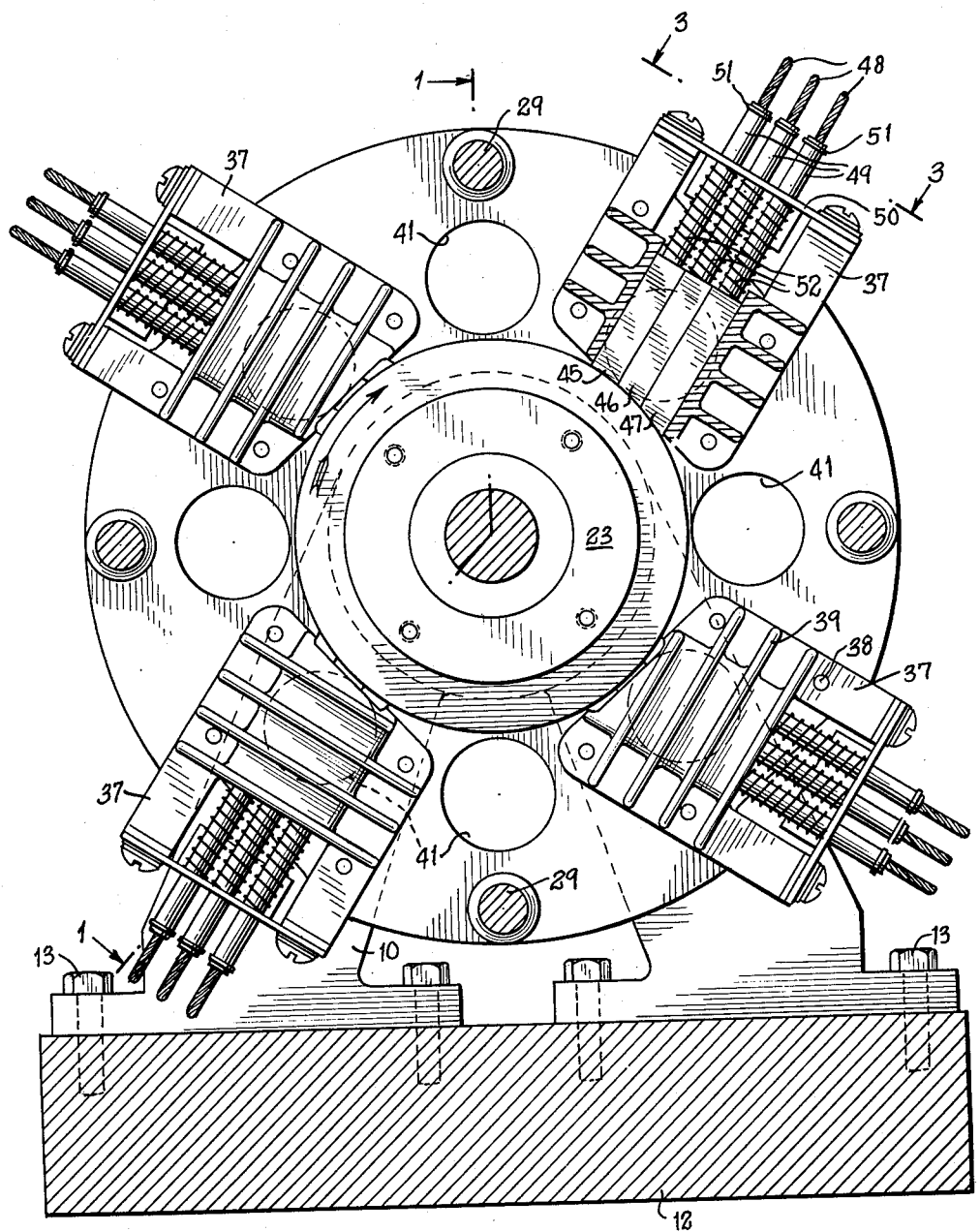

FIGS. 1 and 2 illustrate the general construction of an alternating current synchronous switch embodying the present invention. The switch includes opposed metal pedestals 10 and 11 positioned upon and secured to a metal base plate 12 by machine screws 13 as shown. The upper end of each of the pedestals 10 and 11 is provided with a removable cap 14 secured to the pedestal by machine screws 15 inserted through apertures in opposed side flanges of the cap and engaging threaded bores in the top surface of the pedestal. The pedestals 10 and 11 and their top caps 14 are provided with coaxially aligned bores 16 to receive ball bearing adapter housings 17 having end bores 18 to receive the outer race of a conventional ball bearing assembly 19. The inner race of the ball bearing assembly 19 is pressed upon and rotatably supports a shaft 20 adapted to be coupled by a conventional coupling, not shown, to a synchronous driving motor. A key 21 inserted in a key slot 22 of the shaft 20 prevents relative rotation between the shaft and coupling. An electrical commutator rotor member 23, hereinafter more fully described, is pressed upon the shaft 20 to be rotatably driven thereby. In the fully assembled switch, the rotor member 23 is resiliently centered by corrugated springs 5 positioned between the outer race of the ball bearing assembly 19 and the ends of the bores 18 of the housings 17.

The ball bearing adapter housings 17 are angularly adjustable, for a purpose presently to be described, upon loosening the cap 14 from its associated pedestal but are normally restrained against angular movement by tightening the cap to its associated pedestal. The inner end of each of the housings 17 is provided with a flange 24, and a centrally apertured disc 25 of insulating material is supported upon the exterior surface of the housing and is secured by machine screws 26 to the flange 24 of the housing as shown. The two discs 25 are maintained in fixed spaced relation by peripheral spacer posts 29 having threaded end studs 30 which extend through apertures 31 of the discs 25 and are secured thereto by nuts 32 threaded on the studs 30. As shown in FIG. 1, the nuts 32 threaded on the left hand studs 31 are elongated to receive at their outer ends machine screws 33 which support one wall 34 of an enclosing housing, not shown, provided for a purpose presently to be explained.

As shown more clearly in FIG. 2, each of the insulating discs 25 supports four equally spaced brush holders 37 which are of cast metal and are secured to the insulating disc by machine screws, not shown, which extend through the disc and are screwed into threaded apertures 38 of the holders. The brush holders have integrally formed cooling fins 39, and have ports 40 which are aligned with apertures 41 provided in the insulating discs 25 and through which forced cooling air is blown to cool the brush holders. A continuous flow of cooling air is forced into the housing earlier mentioned, but not shown, which encloses the synchronous switch and the housing has suitable interior baffles to direct the flow of cooling air through the apertures 41 and parts 40 for circulation around the cooling veins 39 and for subsequent withdrawal of the cooling air from a central region of the housing.

As shown more clearly in FIGS. 3–7, each brush holder 37 has a central bore of rectangular cross-section in which three conventional carbon brushes 45, 46 and 47 are positioned. Each such brush has a flexible wire lead 48 which is secured at one end to the brush in conventional manner and extends through a hollow metallic tube 49 having one end loosely inserted into a cylindrical bore 43 formed in the end of the brush holder concentric with the lead 48. Each tube 49 has an aperture 44 through which the tube is soldered to the wire lead 48 to retain the tube in assembled relation with its associated brush while yet providing a form of swiveled joint between the tube and brush. The brushes have a small amount of free side play in the bore of the brush holders, and this play and the swiveled joint last mentioned enable each brush to have full-area contact with the surface tracks of the commutator member. Each of the tubes 49 slidably extends through an individual aperture of a plate 50, and is secured within the aperture of the plate by a C-washer 51 engaging a circumferential groove formed near the end of the tube 49. Helical springs 52 are positioned over the tubes 49 to bias an associated brush 45, 46 or 47 into engagement with the surface of the rotatable commutator member 23. The flexible wire leads 48 are mechanically crimped between an upturned end portion of a flange 53 provided along the edge of the plate 50 and are soldered to the flange to insure a low ohmic electrical connection between each brush and the plate 50 and through the latter to the brush holder 37.

The use of plural brushes in each brush holder has the important advantage that at least two of the brushes remain in constant engagement with the commutator surface even though one of the brushes might be temporarily raised above the commutator surface by a small body of foreign material which may have become embedded in the commutator surface. It has been found in practice that the rotational motion of the commutator surface past the brushes tends to pack the brushes against each other in the direction of rotation and to press the surface of the last brush against the wall of the brush holder. To insure free movement of the brushes relative to each other under operating conditions and by reason of small commutator imperfections as last mentioned, the spring 52 associated with the brush 47 exerts a larger bias force than does the spring associated with the brush 46, and the latter spring exerts a larger bias force than does the spring associated with the brush 45.

The brush holders 37 have integral hollow opposed bridges 55, 56 to which are secured by machine screws 57 a connection plate 58 and the brush plate 50. Each connection plate 58 has a looped end 59 which is crimped over and soldered to wire connectors of large current capacity which interconnect diametrically positioned pairs of the brush holders in a manner presently to be described.

It will be noted from FIG. 2 that the lengths of the brush tubes 49 extending from the plate 50 provide at any time a visual indication of the extent of prevailing wear of the brushes. Brush wear may continue until the C-washers 51 contact the plate 50, and the brushes must then be replaced. This action of the C-washers 51 in limiting the longitudinal movement of the brushes with wear has the important result that the brushes are never permitted through inattention or neglect to wear so far that the embedded ends of the wire leads 48 come into engagement with the commutator surface and score it.

The foregoing described brush constructions and their assemblies with the brush holders are the subject of a copending application of Curtis E. Jackson, Ser. No. 177,777, filed March 6, 1962, and assigned to the same assignee as the present application.

There is seated in the port 40 of one of the brush holders, as illustrated in FIG. 1, a thermostat type of thermal switch 62 having a switch element 63 with terminals 64 connected to electrical conductors 65 and embedded by use of an epoxy 66 in a cylindrical housing 67 of insulating material. The end of the switch element 63 is soldered to the metalized surface of a disc 68 of beryllium oxide which has exceptionally high electrical insulation characteristics and also has good thermal conductivity. The switch 62 is retained in the bore 40 of the brush holder by a washer 69 positioned between the insulating disc 25 and the brush holder, the switch being biased into firm engagement with the bottom surface of the bore by a corrugated spring 70 positioned between the washer 69 and a shoulder 71 of the switch housing 67. The switch 62 is used, in a manner presently to be described, to effect deenergization of the synchronous switch upon excessive temperature rise of the brush holders due to excessively large current conduction by the synchronous switch or by inadequate flow of cooling air or other like reason.

FIGS. 8 and 9 illustrate the construction of the commutator rotor member 23. It is assembled upon a metal core member 73 having an axial bore 74 providing a pressed fit upon the shaft 20 earlier described. The ends of the core member 73 have stepped cylindrical shoulder portions 75 and 76, and each of the shoulder portions 76 is extended into a concentric groove 77 tapered at 78 to form one half of a deep circumferential mortise groove. The other half of the mortise groove is completed by a concentric face groove 79 of a metal face plate 80 centrally apertured to provide a sliding fit upon the cylindrical shoulder 75 of the core member 73. A formed sleeve 81 of mica insulation is positioned upon the cylindrical shoulder 76 of the core member 73 and extends over a cylindrical shoulder 82 of the face plate 80 when the latter is assembled to the core member 73. A formed ring 83 of mica insulation is positioned in each groove 77 of the core member 73 and extends over the peripheral surface of the latter as shown. A second formed sleeve 84 of mica insulation is positioned to overlie the innermost end of the mica ring 83 and also to overlie the inner end of a formed mica ring 85 positioned within the groove 79 of each face plate 80 and extending over the peripheral surface of the latter as shown.

The commutator proper is comprised by two like but axially spaced closed-stack rings of commutator segments of which, as shown in FIG. 8, there are stacks of relatively thick electrically engaging segments 86 and 86a centered upon 90° angular arcs of the commutator and intervening stacks of relatively thin segments 87 having intervening segments 88 of mica insulation material. The commutator segments 86, 86a and 87 are formed of copper and, as shown in FIG. 9, have tenon shaped base portions 89 which form a dovetail connection with the annular mortise groove formed by the grooves 77 and 79 of the respective core member 73 and plate 80 (with groove walls insulated by the mica rings 83 and 85). The assembly of the commutator structure is completed by cap screws 92 which secure the face plates 80 to the core member 73. The outer peripheral edge of each of the face plates 80 is grooved and bevelled as shown, and after assembly of the commutator the resultant annular grooves between the face plates 80 and the mica rings 85 are filled with a high temperature epoxy 93. The outer ends of the mica rings 85 are covered by several layers 94 of mica insulation which may have an overlying covering of glass tape and Glyptal cement. The inner ends of the mica sleeves 83 are similarly covered by several layers 95 of mica insulation which may also have a protective covering of glass tape and Glyptal. The axially spaced stacks of segments 86 are electrically connected by relatively heavy copper rods 96 as shown in FIG. 9, the rods being electrically and mechanically secured at each end to a corresponding segment by means of a hard solder.

The conductive segments 86, 86a and 87 of the commutator provide two axially spaced concentric metallic tracks which are engaged by the brushes of the synchronous switch. The mica insulation segments 88 are undercut beneath the ends of the metallic segments. The per-unit area pressure exerted by the brushes on the ends of the relatively narrow segments 87 is equalized with respect to the thicker segments 86 and 86a by bevelling the edges of the latter to provide transverse grooves 97, and additional similar transverse grooves 97a are preferably provided in the ends of the segments 86 and 86a so that equally spaced grooves extend around the circumference of both of the stacked-rings of commutator segments. The resultant equalization of the per-unit area brush pressure exerted on the brush-engaged end surfaces of the segments 86, 86a and 87 maintains the commutator brush-engageable surfaces quite true and concentric with surface wear. This grooved construction is the subject of a copending application of Curtis E. Jackson, Ser. No. 177,898, filed March 6, 1962, and assigned to the same assignee as the present application.

Upon completion of the commutator assembly, the commutator is placed on a mandrel in a lathe and the ends of the commutator segments 86, 86a and 87 carefully trued to provide concentric brush engageable tracks. The commutator is then dynamically balanced by wedging appropriate quantities of lead as required into apertures 98 drilled axially into the outer surfaces of the segments 86 and 86a.

FIG. 10 is a developed view of the spaced concentric commutator surface tracks provided by the commutator construction just described. As previously noted, adjacent commutator segments 86 and 86a in each stack are in electrical engagement with each other and it will be apparent that each such stack could be fabricated as a unitary elongated arcuate commutator segment. They are so shown for convenience in FIG. 10. It will be seen that the connecting bars 96 electrically connect axially spaced ones of the segments 86 at diametrically opposed commutator locations, but that the commutator segments 86a are not provided with similar connecting bars and hence are electrically insulated from each other and from all other commutator segments and this is true also for the commutator segments 87. The commutator segments 86, while electrically connected by the conductive bars 96, are likewise electrically insulated from all other conductive segments. Since the axially-spaced pairs of brushes 45–47 are mechanically spaced 90° around the periphery of the commutator, it will be apparent that rotation of the commutator causes the commutator segments 86 with their interconnecting conductive bars 96 to provide an electrical connection between successive axially spaced pairs of the brushes whereas the commutator segments 86a although engaged by successive axially spaced pairs of brushes do not electrically interconnect the brushes.

The period of rotation of the commutator for the construction herein described, having diametrically opposed stacks of commutator segments 86 and intervening diametrically opposed stacks of segments 86a, is twice the period of the alternating current which is conducted by the synchronous switch. Thus for sixty cycle alternating current, the commutator rotates at 1800 revolutions per minute. By reason of this, the circumference of the commutator is equivalent to 720 electrical degrees or two cycles of the alternating current. The circumferential lengths of each stack of commutator segments 86 is selected in relation to the circumferential lengths of the brushes such that the sum of these two lengths is equal to or slightly less than 180 electrical degrees. The circumferential length of the stack of commutator segments 87 and intervening mica segments 88 is equal at least to the circumferential brush length, so that the brushes do not at any time complete an electrical connection between the segments 86 and the segments 86a. The sum of the circumferential lengths of a stack of segments 86, a stack of segments 86a, and two stacks of segments 87 and 88 is equal to 360 electrical degrees.

The angular mechanical positioning of the brushes is initially adjusted to attain a proper phase relation with respect to the alternating current conducted by the switch. This is accomplished by loosening the pedestal caps 14 in FIG. 1 and angularly orientating the mechanically connected insulating discs 25 (the discs being thereafter retained in adjusted position by again tightening the caps 14 on the pedestals) to positions such that axially spaced pairs of brushes are centered upon the stacks of commutator segments 86 at the moment of peak alternating current flow between these pairs of brushes through the commutator segments 86 and connecting bars 96. It is apparent that there is then concurrent centering of intervening pairs of axially spaced brushes on the stacks of segments 86a. For this phase adjusted position of the brushes, the alternating current conducted by the axially spaced pairs of brushes starts from zero value as the leading edge of the brushes engage segments 86. As the current increases in value sinusoidally with time, increasingly larger brush areas are brought into engagement with these segments. In a typical synchronous switch construction, the circumferential lengths of the stacks of segments 86 have values corresponding to 120 electrical degrees and the circumferential lengths of the brushes have values corresponding to 60 electrical degrees. For these representative values of segment and brush lengths, the entire brush areas are in engagement with the segments 86 at the moment the value of the conducted current reaches one-half its maximum amplitude value which in a typical application may be several hundred amperes. Accordingly it will be clear that the initial current build-up is accompanied by engagement with the segments 86 of increments of brush surface area equal to twice the amount of brush surface required to conduct each increment of increasing current, and by reason of this there is complete absence of any excessive incremental-area brush heating or excessive voltage drop through the brushes during operation of the synchronous switch. The same character of operation prevails as the conducted current decreases in value sinusoidally, and the brushes of axially-spaced pairs begin to leave the segments 86 when the conducted current has decreased to one-half its peak amplitude value and eventually move out of engagement with the segments 86 as the conducted current reaches zero value.

By reason of the selection of the combined circumferential lengths of the stack of segments 86 and the circumferential length of the brushes to have a value equal to 180 electrical degrees, the segments 86 electrically interconnect each pair of axially-spaced brushes throughout the full 180 electrical degrees of each half cycle of the alternating current conducted. Succeeding half cycles of the current are similarly conducted by succeeding pairs of axially spaced brushes. It will be apparent that the direction of current flow between the segments 86 of one segment ring and the segments 86 of the other ring reverses during alternate half cycles of the alternating current. This bidirectional current flow aids in developing a proper surface film on the segments 86. Thus flow of current from a brush to the segments 86 of one segment ring during one half cycle of the conducted current causes a deposit of hard oxide material on these segments, but reverse flow of current from the same segments to the succeeding brush during the next half cycle of current removes the deposited hard oxide material and there is accordingly a proper build-up control of surface film on the segments.

It was previously mentioned that diametrically opposed brush holders mounted on each of the insulating discs 25 (FIG. 1) are electrically connected by conductors of large current carrying capacity. This is shown schematically in FIG. 10 where these interconnecting conductors are identified by the reference numerals 100 and 101, and it will be evident that parallel current-conduction paths between each pair of conductors 100 and between each pair of conductors 101 are provided by diametrically positioned axially-spaced brush pairs. Accordingly each axially-spaced brush pair is required to conduct only one-half of the instantaneous value of total current conducted.

The circumferential length and the transverse width of the brushes is selected in well known manner to attain conduction, without excessive brush temperature rise, of the required magnitude of current in a particular application and the brush material is of a selected type which will minimize the resistive voltage drop through the brushes. In selecting the cross-sectional area of each stack of brushes to attain a given brush area for engagement with the stack of commutator segments 86, it will be apparent that the grooves 97 and 97a (FIG. 8) of the segments must be taken into account and that the brush area must accordingly be selected in relation to the actual segment surface area which is engaged by each group of brushes 45, 46 and 47 (FIG. 7).

In a typical application in which the present synchronous switch may be used, such as that hereinafter described, it may be required that the switch conductive segments 86 conduct several hundred amperes of current while at the same time the stack of commutator idling segments 86a withstand a peak-inverse test voltage of the order of 5,000 to 10,000 volts applied to these segments by those brushes which engage them at any given time. This applied potential is not only impressed between the segments 86a of one segment ring and the segments 86a of the other ring, but is also impressed between the segments 86a of each ring and the segments 86 of that ring. It has previously been pointed out that the segments 86a and 87 are electrically insulated from all other segments of its associated ring and from the commutator core member 73 and end plate 80 (FIG. 9), and the commutator structure heretofore described insures adequate insulaton of the commutator segments for this purpose. In this regard, it will be noted that the stack of commutator segments 87 and intervening mica segments 88 produces a uniform potential gradient through the latter with respect to the potential difference appearing between each stack of commutator segments 86a and the adjacent stacks of commutator segments 86.

FIG. 11 is a developed view of a commutator structure of modified segment configuration suitable for use in the synchronous switch of the present invention. Components of FIG. 11 corresponding to similar components of FIG. 10 are identified by similar reference numerals, and analogous components by similar reference numerals primed. In this commutator configuration, the commutator segments 86' are shown by way of example as extending across both of the brush tracks rather than having individual segments 86 in each track and connecting bars 96 as in the FIG. 10 configuration. The commutator segments 87 are thicker than in the FIG. 10 commutator and there are fewer of these segments in each stack, and there are two intermediate relatively longer commutator segments 86'a with an intervening mica segment 102 which serve the same function as the stack of segments 86a of the FIG. 10 construction. The insulating segments 102 are needed in the present commutator configuration for the reason that the stack of commutator segments 87 has a circumferential length less than the circumferential length of the brushes 45–47 (of which only two pair are shown for simplicity). Thus the brushes concurrently engage for a short interval the intermediate commutator segments 86'a and the segment 86' adjacent thereto and the insulating segments 102 prevent completion of an electrical path, through pairs of segments 86'a, between adjacent brushes positioned on the same side of the synchronous switch. It may be noted in respect to the latter character of operation that any peak-inverse test voltage applied to the synchronous switch has zero value at the time the brushes are located over the commutator segments 87, and accordingly the maximum value of such voltage occurs when the brushes are centered upon the insulating segments 102 so that equal voltage gradients are then developed across the insulated segments 88 which intervene between the conductive segments 87. The general construction and characteristic mode of operation of this form of commutator construction is otherwise essentially similar to that described in connection with FIG. 10.

An additionally modified form of commutator construction is illustrated in the developed view of FIG. 12. The bridging segments 86' of this construction are similar to those of FIG. 11, and the intervening segments 86a in each brush track are similar to those of FIG. 10. In the present construction, however, relatively thick commutator segments 103 are used in each track at each end of the segments 86a and relatively thick insulating segments 104 of mica or the like insulating material intervene between the segments 103 and the segments 86' and 86a as shown. This form of commutator construction and its characteristic operation are likewise essentially similar to those described in connection with FIG. 10.

An additionally modified form of commutator configuration is illustrated in developed view in FIG. 13. Each track includes two elongated intermediate segments 86"a positioned between the bridging segments 86' and separated from each other and from the bridging segments by insulating segments 105 of mica or other suitable insulating material. The general construction and characteristic mode of operation of this commutator configuration likewise are similar to those described in connection with FIG. 10.

It will be understood that the commutator constructions illustrated in FIGS. 11–13 may utilize stacks of relatively thin and electrically engaging commutator segments in the manner of the stack of segments 86 and 86a shown in FIG. 8, and that it is preferable to provide spaced transverse grooves spaced along the lengths of the conductive segments or each conductive stack of segments (each groove width corresponding to the width of the insulating segments employed in each track) to maintain uniform segment wear as explained in connection with the first described commutator construction.

A typical application in which the synchronous switch of the present invention is suitable for use is in semi-conductor diode testing systems as represented by the circuit diagram of FIG. 14. The system includes a power transformer 108 having a primary winding 109 energized through normally closed contacts of a relay 110 from a source of alternating current supplied to input terminals 111. The transformer 108 is provided with a low voltage but high current secondary winding 112 having one terminal connected through load resistors 113 and diode rectifier devices 114 to a diametrically opposed pair of brushes 115 positioned on one side of the synchronous switch and having its other terminal connected to a diametrically opposed pair of brushes 116 axially-spaced from the brushes 115 and positioned on the other side of the synchronous switch. The brushes 115 are electrically connected to a diametrically opposed pair of brushes 117 positioned on the opposite side of the synchronous switch from the brushes 115 but spaced 90 angular degrees (180 electrical degrees) from the brushes 116. The transformer 108 also is provided with a low voltage but high current secondary winding 118 having one terminal connected through load resistors 119 and diode rectifier devices 120 to brushes 115 and 117 and having its opposite terminal connected to a diametrically opposed pair of brushes 121 which are located 90 mechanical degrees (180 electrical degrees) from the brushes 115. A transformer 122 has a primary winding 123 energized from the source of input alternating current, and has a secondary winding 125 connected to the brushes 116 and 121 and providing a peak-inverse test voltage of relatively large value. The commutator of the synchronous switch is that theretofore described in connection with FIGS. 8, 9 and 10, and the segments of the switch shown in FIG. 14 have the same identifying numerals as in FIGS. 8–10. The thermal switch 62, described in connection with FIG. 1 and shown as enclosed in a broken line box in FIG. 14, is connected to energize the relay 110 and thus interrupt energization of the transformers 108 and 112 upon excessive temperature rise of the brushes of the synchronous switch for any reason.

Consider now the operation of the test system just described. The synchronous switch is shown in FIG. 14 as completing an electrical circuit between the synchronous switch brushes 115 and 116, and thus completes the electrical circuit from the transformer winding 112 and the load resistors 113 to the diode rectifier devices 114. As previously pointed out, the commutator is driven by a synchronous motor (not shown) and the brush positioning is so phased with respect to the alternating current applied to the input terminals 111 as to cause the voltage developed in the transformer winding 112 to produce current flow through the diode rectifier devices 114 throughout the full 180 electrical degrees or one-half cycle of this voltage. During this half cycle, the commutator segments 86a do not complete an electrical circuit between the brushes 117 and 121 and this enables the large peak-inverse test voltage developed in the transformer winding 125 to be applied to the non-conductive diode rectifiers 120 through a circuit which includes the commutator brushes 115 and 116, the commutator segments 86 and interconnecting bars 96, and which also includes the transformer secondary winding 118 and the load resistors 119. During the succeeding half cycle of the energizing source, the commutator moves to a position where the commutator segments 86 complete an electrical connection between the synchronous switch brushes 117 and 121 and thus enables the transformer secondary winding 118 to produce current flow through the diode rectifier devices 120. During this half cycle also, the large peak inverse test voltage of the transformer secondary winding 125 is applied across the nonconductive diode rectifier devices 114 through the brushes 117 and 121, the commutator segments 86 and interconnecting bars 96, the transformer winding 112 and the load resistors 113.

Thus the synchronous switch operates to render the diode rectifier devices 114 and 120 alternately conductive and at the same time causes the peak inverse test voltage to be alternately applied to the nonconductive ones of the rectifier devices. Curve A of FIG. 15 is reproduced from an oscilloscope trace of the current waveform of the current conducted by the synchronous switch during successive half cycles when the switch is operating in a test system of the type just described. It will be noted that current flow continues through the full 180 electrical degrees of each half cycle except for an initial short interval required for the applied voltage of the transformer secondary windings 112 and 118 to rise to a small value required to render the rectifier devices conductive. Curve B of FIG. 15, also reproduced from an oscilloscope trace, represents the peak inverse test voltage applied to one set of the nonconductive ones of the diode rectifier devices 114 or 120. Where the diode rectifier devices under test are connected in parallel as shown in FIG. 14, the magnitude of the peak-inverse test voltage has a value corresponding to the rated inverse voltage of each diode and the total current conducted during each half cycle by the synchronous switch corresponds to the sum of the maximum rated currents of each group of parallel-connected diode devices. In certain diode test systems, it is desirable to test series-connected diode rectifier devices rather than to test them in parallel as just described. A conventional type of semiconductor diode rectifier device has a forward current conduction rating of 200 amperes and a peak inverse voltage rating of 1,000 volts. If, for example, five of these diodes are tested in series the current conducted by the synchronous switch during each half cycle is 200 amperes and the peak inverse test voltage then has the value of 5,000 volts. This large value of voltage may be safely handled by the synchronous switch of the present invention as earlier pointed out.

It will be apparent from the foregoing description of the invention that an alternating current synchronous switch embodying the invention is characterized by a relatively compact and simplified construction and is one adapted to handle large values of current of the order of hundreds of amperes and to provide current conduction through a full 180 electrical degrees of each half cycle of the alternating current supplied through the switch. The synchronous switch has the further advantage that it is enabled to conduct large values of current without brush overheating or excessive brush voltage drop or brush arcing, and is particularly suitable for handling the relatively large values of current and peak inverse test voltages encountered in semiconductor diode rectifier testing applications.

While specific forms of invention have been described for purposes of illustration, it is contemplated that numerous changes may be made without departing from the spirit of the invention.

What is claimed is:

1. An alternating current synchronous switch comprising, a plurality of electrical brushes having substantial dimensional elongation of the order of 60 electrical degrees and adapted to be supported with said dimensional elongation oriented normal to a rotational axis of said switch and in axially opposed spaced brush pairs, a rotatable member adapted for synchronous rotational drive about said axis and having successively positioned peripheral arcuate conductive segments providing two axially spaced concentric tracks which are engageable by individual brushes of each pair thereof and alternate ones of which effectively electrically span said tracks to establish an electrically conductive path between successive axially opposed pairs of said brushes throughout alternate ones of successive 180 electrical degree angular movements of said member, the segments intervening between said alternate segments establishing an electrically insulated path between said successive pairs of brushes throughout each of the intervening ones of said successive 180 electrical degree angular movements of said member, a frame member rotatably supporting said member for rotation about said axis and fixedly supporting said brushes in electrically insulated relation to one another and by said oriented opposed-brush pairs spaced around said member with 180 electrical degree angular spacings, and means for biasing said brushes into engagement with individual ones of said tracks.

2. An alternating current synchronous switch comprising, a rotatable member rotationally supported by a frame member and adapted to be driven at substantially constant angular velocity and with a rotational period corresponding to a preselected integral number of 360° cyclic periods of said alternating current, a plurality of electrical brushes and means on said frame member for supporting said brushes in electrically insulated relation to one another and in axially opposed pairs spaced equi-distant around said rotatable member and for biasing said brushes to engage on a concentric annular surface area thereof equal circumferential lengths each corresponding to a preselected number of electrical degrees, first conductive means providing in electrically insulated relation to one another on said annular surface area and equally spaced therearound alternately positioned conductive switching and idling segments each of circumferential length which added to the circumferential length of one of said brushes is equal substantially to 180 electrical degrees and said switching segments electrically spanning said annular surface area to provide a conductive path between the brushes of successively engaged pairs thereof throughout each 180 electrical degree rotation of said rotatable member, and second conductive means additionally providing on said annular surface individually electrically insulated conductive segments of relatively short circumferential length and positioned in intervening relation between each of said switching and idling segments.

3. An alternating current synchronous switch comprising, a rotatable member rotationally supported by a frame member and adapted to be driven at substantially constant angular velocity and with a rotational period corresponding to a preselected integral number of 360° cyclic periods of said alternating current, a plurality of electrical brushes and means on said frame member for supporting said brushes in electrically insulated relation to one another and spaced in axially opposing pairs equi-distant around said rotatable member and for spring biasing said brushes to engage on spaced concentric annular surface tracks of said rotatable member equal circumferential lengths each corresponding to a preselected number of electrical degrees, first conductive means providing in electrically insulated relation to one another on said annular surface tracks and equally spaced in opposing pairs therearound alternately positioned conductive switching and idling segments each of circumferential length which added to the circumferential length of one of said brushes is equal substantially to 180 electrical degrees and said switching segments electrically spanning across said spaced annular surface tracks to provide a conductive path between the opposed brushes of successive pairs thereof throughout each 180 electrical degree rotation of said rotor member, and second conductive means additionally providing on said annular surface tracks individually electrically insulated conductive segments of relatively short circumferential length and positioned in intervening relation between each of said switching and idling segments.

4. An alternating current synchronous switch comprising, a rotatable member rotationally supported by a frame member and adapted to be driven at substantially constant angular velocity and with a rotational period corresponding to a preselected integral number of 360° cyclic periods of said alternating current, a plurality of electrical brushes and means on said frame member for supporting said brushes in electrically insulated relation to one another and spaced in axially opposing pairs equi-distant around said rotatable member and for biasing said brushes to engage on spaced concentric annular surface areas of said rotatable member equal circumferential lengths each corresponding to a preselected number of electrical degrees, conductive segments supported in electrically insulated relation on said rotatable member and equally spaced therearound to provide on said spaced annular surface areas spaced conductive switching segments each of circumferential length which added to the circumferential length of one of said brushes is equal substantially to 180 electrical degrees and each electrically spanning across said spaced annular surface areas to provide a conductive path between the opposed brushes of successive pairs thereof throughout each 180 electrical degree rotation of said rotatable member, and plural individually electrically insulated idling segments having circumferential lengths not greater than the circumferential length of said switching segments and supported on said rotatable member in opposed pairs providing plural segments of said annular surface areas substantially closing the space between said switching segments and with any longer of said idling segments centrally positioned between said switching segments.

5. An alternating current synchronous switch comprising, a rotatable member rotationally supported by a frame member and adapted to be driven at substantially constant angular velocity and with a rotational period corresponding to a preselected integral number of 360° cyclic periods of said alternating current, a plurality of electrical brushes and means on said frame member for supporting said brushes in electrically insulated relation to one another and spaced in axially opposing pairs equi-distant around said rotatable member and for biasing said brushes to engage on spaced concentric annular surface areas of said rotatable member equal circumferential lengths each corresponding to a preselected number of electrical degrees, conductive segments supported in electrically insulated relation on said rotatable member and equally spaced therearound to provide on said spaced annular surface areas spaced conductive switching segments each of circumferential length which added to the circumferential length of one of said brushes is equal substantially to 180 electrical degrees and each electrically spanning across said spaced annular surface areas to provide a conductive path between the opposed brushes of successive pairs thereof throughout each 180 electrical degree rotation of said rotatable member, and plural individually electrically insulated idling segments having differing circumferential lengths of which the longest is not greater than the circumferential length of said switching segments and supported on said rotatable member in opposed spaced-apart pairs providing plural segments of said annular surface areas substantially closing the space between said switching segments and with the longest of said idling segments centrally positioned between said switching segments.

6. An alternating current synchronous switch comprising, a rotatable member rotationally supported by a frame member and adapted to be driven at substantially constant angular velocity and with a rotational period corresponding to a preselected integral number of 360° cyclic periods of said alternating current, a plurality of electrical brushes and means on said frame member for supporting said brushes in electrically insulated relation to one another and spaced in axially opposing pairs equi-distant around said rotatable member and for biasing said brushes to engage on spaced concentric annular surface areas of said rotatable member equal circumferential lengths each corresponding to a preselected number of electrical degrees, conductive segments providing in electrically insulated relation to one another on said annular surface areas and equally spaced in opposing pairs threrearound alternately positioned conductive switching and idling segments each of circumferential length which added to the circumferential length of one of said brushes is equal substantially to 180 electrical degrees and with said switching segments electrically spanning across said spaced annular surface areas to provide a conductive path between the opposed brushes of successive pairs thereof throughout each 180 electrical degree rotation of said rotatable member, and a plurality of individually electrically insulated conductive segments of relatively short circumferential length positioned in the intervening space between each of said switching and idling segments.

7. An alternating current synchronous switch comprising, a rotatable member rotationally supported by a frame member and adapted to be driven at substantially constant angular velocity and with a rotational period corresponding to two 360° cyclic periods of said alternating current, four pairs of electrical brushes and means on said frame member for supporting said brushes in electrically insulated relation to one another and spaced in axially opposing pairs at 180 electrical degree spacings around said rotatable member and for biasing said brushes to engage on spaced concentric annular surface areas of said rotatable member equal circumferential lengths each corresponding to a preselected number of electrical degrees, first conductive means providing in electrically insulated relation to one another on said annular surface areas and equally spaced therearound alternately positioned conductive switching and idling segments each of circumferential length which added to the circumferential length of one of said brushes is equal substantially to 180 electrical degrees and with said switching segments providing a conductive path between the opposed brushes of successive pairs thereof throughout each 180 electrical degree rotation of said rotatable member, and second conductive means additionally providing on said annular surface individually electrically insulated conductive segments of relatively short circumferential length and positioned in intervening relation between each of said switching and idling segments.

8. An alternating current synchronous switch comprising, a rotatable member rotationally supported by a frame member and adapted to be driven at substantially constant angular velocity and with a rotational period corresponding to two 360° cyclic periods of said alternating current, four pairs of electrical brushes and means on said frame member for supporting said brushes in electrically insulated relation to one another and spaced in opposing pairs at 180 electrical degree spacings around said rotatable member and for biasing said brushes to engage on spaced concentric annular surface areas of said rotatable member equal circumferential lengths each corresponding to a preselected number of electrical degrees, four pairs of conductive segments supported in electrically insulated and spaced opposing-pair relation on said rotatable member and equally spaced therearound to provide segments of said annular surface areas having alternately positioned conductive switching and idling segments each of circumferential length which added to the circumferential length of one of said brushes is equal substantially to 180 electrical degrees and with said switching segments in opposing relation and electrically connected to provide a conductive path between the brushes of diametrically positioned opposed pairs thereof throughout each 180 electrical degree rotation of said rotor member, and conductive segments of relatively short circumferential length additionally supported in individually electrically insulated relation on said rotatable member and positioned in intervening relation between each of said switching and idling segments to provide additional segments substantially completing said concentric annular surface areas.

9. An alternating current synchronous switch comprising, a rotatable member rotationally supported by a frame member and adapted to be driven at substantially constant angular velocity and with a rotational period corresponding to a preselected integral number of 360° cyclic periods of said alternating current, a plurality of electrical brushes and means on said frame member for supporting said brushes in electrically insulated relation to one another and spaced in opposing pairs equi-distant around said rotatable member and for biasing said brushes to engage on spaced concentric annular surface areas of said rotatable member equal circumferential lengths each corresponding to approximately 60 electrical degrees, first conductive means providing in electrically insulated relation to one another on said annular surface areas and equally spaced in opposing pairs therearound alternately positioned conductive switching and idling segments of which each switching segment has a circumferential length equal approximately to 120 electrical degrees and with said switching segments electrically spanning across said spaced annular surface areas to provide a conductive path between the opposed brushes of successive pairs thereof throughout each 180 electrical degree rotation of said rotatable member, and second conductive means additionally providing on said annular surface individually electrically insulated conductive segments of relatively short circumferential length and positioned in intervening relation between each of said switching and idling segments.

10. An alternating current synchronous switch comprising, a rotatable member rotationally supported by a frame member and adapted to be driven at substantially constant angular velocity and with a rotational period corresponding to a preselected integral number of 360° cyclic periods of said alternating current, a plurality of electrical brushes and means on said frame member for supporting said brushes in electrically insulated relation to one another and spaced in opposing pairs equi-distant around said rotatable member and for biasing said brushes to engage on spaced concentric annular surface areas of said rotatable member equal circumferential lengths each corresponding to approximately 60 electrical degrees, first conductive means providing in electrically insulated relation to one another on said annular surface areas and equally spaced in opposing pairs therearound alternately positioned conductive switching and idling segments of which each switching segment has a circumferential length equal approximately to 120 electrical degrees and with said switching segments electrically spanning across said spaced annular surface areas to provide a conductive path between the opposed brushes of successive pairs thereof throughout each 180 electrical degree rotation of said rotatable member, and second conductive means additionally providing on said annular surface individually electrically insulated conductive intervening segments of relatively short circumferential length and positioned in intervening relation between each of said switching and idling segments to provide at each end of a switching segment a circumferential length of electrically interrupted idling segments equal at least to the circumferential length of each said brush.

11. An alternating current synchronous switch comprising, a rotatable member rotationally supported by a frame member and adapted to be driven at substantially constant angular velocity and with a rotational period corresponding to two 360° cyclic periods of said alternating current, four pairs of electrical brushes of rectangular cross-section and means on said frame member for supporting said brushes in electrically insulated relation to one another and spaced in opposing pairs equi-distant around said rotatable member and for biasing said brushes to engage on spaced concentric annular surface areas of said rotatable member equal circumferential lengths each corresponding to a preselected number of electrical degrees, conductive arcuate segments supported in electrically insulated relation on said rotatable member and equally spaced therearound to provide on said spaced annular surface areas spaced conductive switching segments each of circumferential length which added to the circumferential length of one of said brushes is equal substantially to 180 electrical degrees and each electrically spanning across said spaced annular surface areas to provide a conductive path between the opposed brushes of successive pairs thereof throughout each 180 electrical degree rotation of said rotor member, and plural individually electrically insulated idling segments having circumferential lengths not greater than the circumferential length of said switching segments and supported on said rotatable member in opposed pairs providing plural segments of said annular surface areas substantially closing the space between said switching segments and providing at each end thereof a circumferential length of electrically interrupted idling segments equal at least to the circumferential length of each said brush.

12. An alternating current synchronous switch comprising, a rotatable member journalled in trunnions and adapted to be driven at substantially constant angular velocity and with a rotational period corresponding to a preselected integral number of 360° cyclic periods of said alternating current, conductive arcuate segments supported in electrically insulated relation on the periphery of said rotatable member and equally spaced therearound to provide spaced conductive switching segments each of circumferential length approximately equal to 120 electrical degrees and each providing an electrically conductive path between spaced concentric annular tracks on said rotatable member, plural individually electrically insulated idling arcuate segments having circumferential lengths not greater than the circumferential length of said switching segments and supported on the periphery of said rotatable member in opposed pairs providing plural segments in said annular tracks and substantially closing the space between said switching segments, and a plurality of electrical brushes and spaced trunnion-supported discs of insulating material for supporting said brushes in insulated relation and spaced in opposing pairs equidistant around said rotatable member to engage said switching and idling segments on circumferential lengths of said concentric tracks each corresponding to approximately 60 electrical degrees.

13. An alternating current synchronous switch comprising, a rotatable member adapted for synchronous rotational drive and having plural pairs of axially spaced arcuate conductive segments of approximately 120 electrical degrees circumferential lengths and angularly centered upon 180 electrical degree circumferential spacings and having intervening stacks of alternating conductive and insulating undercut segments extending over approximately 60 electrical degree circumferential lengths of said member to provide two axially spaced concentric metallic tracks which are engageable by electrical brushes having substantial dimensional elongation of the order of 60 electrical degrees along said tracks, alternate ones of said axially spaced pairs of conductive segments being electrically connected to establish an electrically conductive path between an axially spaced pair of said brushes throughout the alternate ones of successive 180 electrical degree angular movements of said member but the intervening ones of said axially spaced pairs of said segments establishing an electrically insulated path between said pair of brushes throughout each of the intervening ones of said successive 180 electrical degree angular movements of said member, and a frame member rotatably supporting said rotatable member and fixedly supporting in electrically insulated relation pairs of said brushes spaced by pairs around said member at 180 electrical degree angular spacings and with the brushes of each pair positioned in axially opposing relation and biased into engagement with individual ones of said metallic tracks.

14. An alternating current synchronous switch comprising a plurality of electrical switching brushes having substantial dimensional elongation and adapted to be supported with said dimensional elongation oriented normal to a rotational axis of said switch, a rotatable member adapted for synchronous rotational drive about said axis and having peripheral arcuate conductive segments electrically insulated from one another and providing a concentric track engageable by said brushes, alternate ones of said segments having a length selected in relation to said dimensional elongation of said brushes to effect engagement of said brushes with said alternate segments throughout each complete 180 electrical degree angular movement of said member and the intervening segments having a length approximately equal to said dimensional elongation of said brushes, a frame member rotatably supporting said member for rotation about said axis and fixedly supporting said brushes with said orientation and in electrically insulated relation to one another and spaced around said member at 180 electrical degree angular spacings, means for biasing said brushes into engagement with said conductive segments, and means including at least one further electrical brush supported in electrically insulated relation on said frame and axially spaced from said switching brushes for engaging a cooperating concentric-track conductive surface carried by said rotatable member and providing an electrical circuit from said further brush to preselected ones of said alternate segments.

References Cited in the file of this patent
UNITED STATES PATENTS

| | | |
|---|---|---|
| 1,509,666 | Campbell | Sept. 23, 1924 |
| 1,731,513 | Wagner | Oct. 15, 1929 |

UNITED STATES PATENT OFFICE
CERTIFICATE OF CORRECTION

Patent No. 3,134,863　　　　　　　　　　　　　　　May 26, 1964

John F. Brady

It is hereby certified that error appears in the above numbered patent requiring correction and that the said Letters Patent should read as corrected below.

Column 1, line 64, for "out excessive brush arcing" read -- chronous switches --; column 6, line 3, for "communtator" read -- commutator --; column 7, line 50, for "plate" read -- plates --.

Signed and sealed this 20th day of October 1964.

(SEAL)
Attest:

ERNEST W. SWIDER　　　　　　　　　　　　　　EDWARD J. BRENNER
Attesting Officer　　　　　　　　　　　　　　　Commissioner of Patents